United States Patent Office 3,822,232
Patented July 2, 1974

3,822,232
COLD-SETTING COATING COMPOSITION BASED ON CARBOXYL-CONTAINING VINYL POLYMER
Ching Yun Huang, Minoo, Naomitsu Takashina, Fujisawa, Senzo Shimizu, Chigasaki, Masahiro Shimoi, Hiratsuka, Masuya Ikegami, Chigasaki, Naoki Iwasaki, Hiratsuka, and Rokuro Fujita, Chigasaki, Japan, assignors to Mitsubishi Gas-Chemical Company, Inc., Tokyo, Japan
No Drawing. Filed Dec. 29, 1972, Ser. No. 319,669
Claims priority, application Japan, Dec. 29, 1971, 47/3,114
Int. Cl. C08f 45/28, 45/30, 45/36
U.S. Cl. 260—31.2 MR         11 Claims

ABSTRACT OF THE DISCLOSURE

A cold-setting coating composition of one-package type comprising (1) a copolymer of at least one ethylenic or diene monomer and at least one $\alpha,\beta$-ethylenically unsaturated carboxylic acid, (2) a complex compound of (a) an alkyl or alkenyl titanate with (b) at least equimolar amount of a $\beta$-diketone or its mixture with at least one other keto-enol tautomeric compounds containing at least 0.5 mole of $\beta$-diketone, the ratio of said complex compound to the carboxyl group of said copolymer being 0.1 to 5.0 moles of the former to one equivalent of the latter; or a mixture of (a) an alkyl or alkenyl titanate and (b) at least equimolar amount of a keto-enol tautomeric compound, the ratio of the (a) component to the carboxyl group of said copolymer being 0.1 to 5.0 moles of the former to one equivalent of the latter, and (3) a non-aqueous solvent. The cured film obtained from the said coating composition is excellent in resistance to weathering, solvents, and chemicals as well as in adhesion, gloss, and hardness.

---

This invention relates to a one-package type, cold-setting coating composition, and, more particularly, to a one-package type cold-setting coating composition comprising a vinyl polymer having carboxyl groups and a complex compound of (a) an alkyl or alkenyl titanate with (b) a $\beta$-diketone or its mixture with at least one other keto-enol tautomeric compound containing at least 0.5 mole of $\beta$-diketone, or a mixture of said (a) and (b).

Coating materials based on a vinyl polymer having carboxyl groups, particularly acrylic polymers, have heretofore been widely used, since they possess an excellent weather and chemical resistance. However, such vinyl polymers are thermoplastic and their uses are limited accordingly. Therefore, it is a usual practice to incorporate a hardening component into such vinyl polymers, thereby allowing the polymers to form a three-dimensional network. Such methods involve the compounding of these vinyl polymers with hardening components, including amino resins such as urea- and melamine-resins, epoxy resins or isocyanates and then heat-setting the polymers.

In the case where melamine resins, epoxy resins and the like are compounded as hardening components, such a heat treament as baking at a temperature of 150° C. or higher, preferably 150° to 180° C. for about 10 to 30 minutes is necessary to obtain sufficient film properties. Such a heat treatment greatly restricts the uses of a coating. When isocyanates are incorporated, they can be cured at ordinary temperature without any heat treatment. However, in such a case, the coating composition is generally of two-package type and the hardening component is mixed with the other components just before the use of the coating composition. The method of cold-setting a coating composition of two-package type is, however, inconvenient due to the problem of pot life after mixing the hardener with the other components.

As a means for producing a cured product with improved resistance to ultraviolet radiation and staining without using amino resins, such as urea resin or melamine resin, or epoxy resins as mentioned above, there has already been known the use of a resin composition consisting essentially of a mixture of a vinyl polymer having hydroxyl groups and an aluminum alcoholate or an aluminum complex compound (see Japanese Pat. No. 515,861). There has also been known a method of curing a vinyl polymer having epoxy groups and/or hydroxyl groups by using an intramolecular complex compound as the hardening component (see Japanese Pat. No. 585,-220). However, both cases require heat-setting at 150° to 180° C. for 10 to 30 minutes.

U.S. Pat. No. 3,632,546 to the present inventors discloses that one-package type cold-setting acrylic coating compositions capable of yielding a cured film excellent in resistance to weathering, chemicals and solvents can be obtained by compounding a copolymer having carboxyl groups with an aluminum alcoholate complex compound in the presence of a tautomeric compound.

As a result of further studies on one-package type cold-setting coating compositions, the present inventors have found that a one-package type cold-setting coating composition with improved cold-setting ability and film properties can be obtained by incorporating a complex compound of an alkyl or alkenyl titanate with a $\beta$-diketone or its mixture with at least one other keto-enol tautomeric compound containing at least 0.5 mole of $\beta$-diketone, or a mixture of an alkyl or alkenyl titanate and a $\beta$-diketone or its mixture with at least one other keto-enol tautomeric compound containing at least 0.5 mole of $\beta$-diketone into a vinyl polymer having carboxyl groups.

According to the present invention, there is provided a one-package type cold-setting coating composition comprising (1) a vinyl polymer having carboxyl groups, which is obtained by polymerizing at least one ethylenic or diene monomer and at least one $\alpha,\beta$-ethylenically unsaturated carboxylic acid,
(2) a complex compound of (a) a titanate represented by the formula,

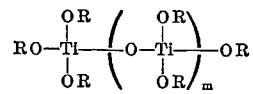

wherein $m$ is 0 or an integer of 1 to 20, preferably 1 to 10, more preferably 1 to 3, and R represents an alkyl group having 1 to 20, preferably 1 to 16, more preferably 1 to 5, carbon atoms or an alkenyl group having 2 to 20, preferably 2 to 16, more preferably 2 to 5, carbon atoms, with (b) at least equimolar amount of a $\beta$-diketone or its mixture with at least one other keto-enol tautomeric compounds containing at least 0.5 mole of $\beta$-diketone, or a mixture of said (a) and (b) components, and
(3) a non-aqueous solvent.

The term "a mixture of (a) and (b) components" used herein means to cover not only a simple mixture of said (a) and (b) components but also mixtures containing these components and a minor amount of a complex compound of said (a) and (b) components, unreacted (b) component and alcohols formed in the reaction of said (a) and (b) components. In the present coating composition, the above-mentioned mixture can effectively contribute to the curing, too.

The cold-setting coating composition according to this invention is of a one-package type, is curable at ordinary temperature, and can form a tough film which is excellent in resistance to weathering, chemicals, and solvents and does not lose surface gloss by ultraviolet radiation. Further, the coating composition of this invention is excellent in stability on storage. The coating composition of this invention is useful for coating automotive bodies, electric household appliances and furniture.

After having been applied by spraying or dipping, the coating composition of this invention forms a film as the volatile components evaporate at ordinary temperature, and the film cures itself with the formation of a three-dimensional net-work to gain excellent film properties such as resistance to weathering, chemicals, and solvents, adhesion, gloss, hardness, etc. The film properties may be further improved by after-treatment at a temperature of 50° to 100° C. after evaporation of the volatile components from the applied coating composition of this invention. A heat treatment at still higher temperatures accelerates curing. The coating composition of this invention can, of course, be also cured in the same manner as for thermosetting types.

The coating composition of this invention is prepared by adding to a non-aqueous solution of a vinyl polymer having carboxyl groups 0.1 to 5.0 moles of the aforesaid complex compound or a mixture of 0.1 to 5.0 moles of an alkyl or alkenyl titanate and at least equimolar amount of a keto-enol tautomeric compound, per equivalent of the carboxyl groups contained in the polymer.

The coating composition of this invention thus obtained has a good storage stability, showing neither degeneration nor gel formation during a long period of storage.

The vinyl polymer having carboxyl groups used in the coating composition of this invention is a copolymer obtained by copolymerizing one or more ethylenic or conjugated diene monomers and one or more $\alpha,\beta$-ethylenically unsaturated carboxylic acids. The ethylenic and diene monomers, include, for example, ethylene, propylene, butadiene, isoprene, chloroprene, styrene, $\alpha$-methylstyrene, dimethylstyrene, divinyltoluene, vinyl acetate, vinyl propionate, vinyl chloride, vinyl ether, vinylidene chloride, acrylonitrile, methacrylonitrile, alkyl acrylates or methacrylates represented by the formula,

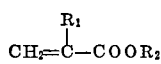

wherein $R_1$ is H or $CH_3$, $R_2$ is an alkyl group having 1 to 12 carbon atoms such as methyl acrylate, ethyl acrylate, butyl acrylate, 2-ethylhexyl acrylate, and lauryl acrylate, methyl methacrylate, ethyl methacrylate, butyl methacrylate, 2-ethylhexyl methacrylate, and lauryl methacrylate, etc. The $\alpha,\beta$-ethylenically unsaturated carboxylic acids include, for example, acrylic acid, methacrylic acid, itaconic acid, maleic acid, maleic anhydride, fumaric acid and crotonic acid. The amount of these, $\alpha,\beta$-ethylenically unsaturated carboxylic acids used is suitably 2 to 30% by weight based on the total weight of all the monomers. The vinyl polymer having carboxyl groups for use in the coating composition of this invention is usually obtained by solution polymerization in a non-aqueous medium, though polymers obtained by other polymerization methods such as bulk polymerization, suspension polymerization, and emulsion polymerization may also be used in the form of a solution in non-aqueous solvent.

The polymerization initiators which may be used in preparing the above-mentioned polymers in this invention include conventional free radical polymerization initiators such as organic peroxides and azonitrile-type compounds and redox catalyst systems. The solvents to be used either in solution polymerization or in preparing the non-aqueous solution of the polymers obtained by other polymerization methods are generally aromatic hydrocarbons; such as benzene, toluene, xylene, etc., ketones, such as methyl ethyl ketone, methyl isobutyl ketone, cyclic ketones, e.g. cyclohexanone, etc.; alcohols such as aliphatic alcohols having 1 to 6 carbon carbon atoms, alicyclic alcohols, e.g. cyclohexanol, etc.; esters such as alkyl acetates, e.g. methyl acetate, ethyl acetate, propyl acetate, butyl acetate, amyl acetate, etc.; ethers such as dimethyl ether, methyl ethyl ether, diethyl ether, Cellosolve, etc.; and petroleum solvents such as solvent naphtha, mineral spirits, etc. These solvents may be used alone or in admixture of two or more. In the present invention, it is preferable to use the polymer in the form of a non-aqueous solution in these solvents.

The titanates used in this invention are those represented by the aforementioned general formula, and examples thereof include tetraethyl titanate, tetraisopropyl titanate, tetrabutyl titanate, tetra(2-ethylhexyl) titanate, tetrastearyl titanate, tetraallyl titanate, tetra-1-butenyl titanate, and dimers and trimers of these compounds.

The $\beta$-diketones used in this invention are such as acetylacetone, benzoylacetone and dibenzoylmethane; and the other keto-enol tautomeric compounds used in this invention may be, for example, acetoacetic esters such as methyl acetoacetate, ethyl acetoacetate, etc.; benzoyl acetates such as methylbenzoyl acetate, ethylbenzoyl acetate, etc.; malonic diesters such as dimethyl malonate, diethyl malonate, dibutyl malonate, etc.; salicylic esters such as methyl salicylate, ethyl salicylate, propyl salicylate, etc.; and salicylaldehyde.

The complex compound used in this invention, which is readily obtained by reaction of an alkyl or alkenyl titanate with a $\beta$-diketone or its mixture with at least one other keto-enol tautameric compound containing at least 0.5 mole of $\beta$-diketone, is an alkyl or alkenyl titanate in which a part or all of its alkoxy or alkenoxy groups have been replaced by $\beta$-diketone alone or in combination with other keto-enol tautomeric compounds. The reaction between the titanate and the $\beta$-diketone or its mixture with at least one other keto-enol tautomeric compound may be effected by mixng the titanate first with at least one keto-enol tautomeric compound other than the $\beta$-diketone and then with the $\beta$-diketone. Accordingly, 1 to 4 moles of a $\beta$-diketone or its mixture with at least one other keto-enol tautomeric compound containing at least 0.5 mole of $\beta$-diketone is generally used in said reaction, per mole of an alkyl or alkenyl titanate. In this invention, acetylacetone is especially preferred as a $\beta$-diketone in preparing the above-mentioned complex compound or the mixture of the (a) and (b) components to give the most stable coating composition.

The complex compounds obtained by the reaction of alkyl or alkenyl titanates with the aforesaid $\beta$-diketone or mixture have different reactivity depending upon the amount of the remaining alkoxy or alkenoxy groups, and the larger the amount of the remaining alkoxy or alkenoxy groups, the higher the reactivity of the compounds with the carboxyl groups. The aforesaid mixture of an alkyl or alkenyl titanate and a $\beta$-diketone or its mixture with at least one other keto-enol tautomeric compound also shows a tendency that the reactivity is increased as the proportion of the latter increases. If the reactivity is too high, it will be difficult, in some cases, to obtain a smooth film because curing may proceed faster than the formation of a smooth film surface, and in some other cases, gel formation may occur during storage. In such cases, the coating composition of this invention is inferior in stability on storage. However, the stability may be controlled by adding to the composition a further $\beta$-diketone such as acetylacetone, benzoylacetone and dibenzoylmethane.

Taking the above-mentioned facts into consideration, the type and amount of the aforesaid complex compound or mixture to be incorporated as a hardening component into the coating composition of this invention are suitably selected according to the acidity and content of the acid component in the vinyl polymers.

Further, it is desirable that the aforesaid complex compound or mixture to be used together with solvents such as, for example, aromatic hydrocarbons, alcohols, ketones, esters, ethers or halohydrocarbons.

Though the mechanism of curing of the said composition is not altogether clear, it seems that the equilibrium in solution between the carboxyl groups in the vinyl polymer and the complex compound is different from that after the composition has been applied, and consequently the composition is stable in solution, whereas during drying after application of the composition, the keto-enol tautomeric compound and the solvent volatilize, whereby the equilibrium is shifted, thereby forming a bond between metallic titanium and the carboxyl radical, resulting in the formation of a three-dimensional net-work.

The cured film thus obtained is no longer soluble in organic solvents such as aromatic hydrocarbons, ketones, esters, and ethers, nor is attacked by gasoline, machine oil, or kerosene, and is excellent in resistance to weathering, chemicals, and solvents as well as in adhesion, gloss, and hardness.

The solid content of the composition of this invention is usually 30 to 70% by weight.

In Table 1 are shown the physical properties of the film obtained by applying on a steel plate a white enamel prepared by use of the present coating composition as a base material. The properties of a film obtained by use of a commercially available thermosetting acrylic coating composition are also shown in the same Table for comparison.

This invention is further explained below in more detail with reference to Examples, which are merely by way of illustration and not by way of limitation. In the Examples, all parts are by weight unless otherwise indicated.

EXAMPLE 1

Into a glass flask were charged 300 parts of mixed xylene and 100 parts of n-butanol. After the air in the flask had been replaced with nitrogen, the temperature in the flask was elevated to the azeotropic point of the mixture of mixed xylene and n-butanol, and the mixture was kept refluxing. Thereafter, to the mixture was added dropwise a solution consisting of 180 parts of methyl methacrylate, 140 parts of n-butyl acrylate, 80 parts of methacrylic acid, and 8 parts of tert-butyl perbenzoate, over a period of about 3 hours. After completion of the addition, the reaction was conducted for a further 3 hours to obtain a colorless clear resin solution with a non-volatile content of 50%, at a conversion of nearly 100%. The Gardner-Holdt viscosity of the resin at 25° C. was V-W. To 100 parts of the said resin solution was added 104.35 parts of mixed xylene together with 104.35 parts of a reaction mixture obtained by reacting 59.14 parts of tetrabutyl titanate and 45.21 parts of acetylacetone, and the mixture was thoroughly mixed to obtain a cold-setting clear varnish having a Gardner-Holdt viscosity of T-U (25° C.). The storage stability of this clear varnish was tested at room temperature for 15 months and at 50° C. for 30 days, find neither viscosity increase nor other changes. To 50 parts in terms of non-volatiles of the said clear varnsh was added 40 parts of rutile-type titanium dioxide and mixed on a 3-roll mill to obtain a white enamel. The enamel obtained was diluted with a thinner to a suitable viscosity, applied on a phosphate-treated steel plate by means of a spray coating and dried at ordinary temperature (20° C.) for 24 hours. The properties of the film thus obtained are shown in Table 1, column A.

EXAMPLE 2

Into a glass flask were charged 50 parts of mixed xylene, 30 parts of n-butanol, and 20 parts of n-butyl acetate. After the air in the flask had been replaced with nitrogen, the temperature in the flask was adjusted to 85° C. Into the flask was added dropwise a solution consisting of 40 parts of styrene, 45 parts of ethyl acrylate, 10 parts of n-butyl methacrylate, 5 parts of acrylic acid, and 2 parts of benzoyl peroxide over a period of about 2 hours. After completion of the dropwise addition, the reaction was continued for a further one hour. To the mixture was then added a further 1.5 parts of benzoyl peroxide, and the reaction was continued for about 5 hours. There was obtained a colorless clear resin solution with a non-volatile content of 50% at a conversion of nearly 100%. The Gardner-Holdt viscosity of this resin solution was T-U at 25° C.

After 14.3 parts of acetylacetone was dissolved homogeneously into 100 parts of the said resin solution, there was added thereto 97 parts of trisethylacetylacetatotitanium (complex compound of tetrabutyl titanate with ethyl acetoacetate) together with 97 parts of mixed xylenes, and the mixture was thoroughly mixed to obtain a cold-setting clear varnish having a Gardner-Holdt viscosity of O-P.

The storage stability of this clear varnish was tested at room temperature for 12 months and at 50° C. for 30 days, to find neither viscosity increase nor other changes.

To 50 parts in terms of non-volatile matter of the said clear varnish was added 40 parts of rutile-type titanium dioxide and mixed on a 3-roll mill to obtain a white enamel.

The said white enamel was diluted with a thinner to a suitable viscosity, applied on a phosphate-treated steel plate by spray coating, and dried at ordinary temperature (20° C.) for 24 hours. The properties of the film thus obtained are shown in Table 1, column B.

EXAMPLE 3

Into a glass flask were charged 500 parts of toluene, 250 parts of methyl isobutyl ketone, and 250 parts of isopropanol. After the air in the flask had been replaced with nitrogen, the temperature in the flask was adjusted to 80° C. Into the flask was added dropwise a solution consisting of 500 parts of ethylmethacrylate, 400 parts of vinyl acetate, 50 parts of methacrylic acid, 50 parts of acrylic acid, and 1.5 parts of azobisisobutyronitrile over a period of about 2 hours. After completion of the dropwise addition, the reaction was continued for another one hour. To the mixture was then added a further 1.5 parts of azobisisobutyronitrile, and the reaction was continued for about 3 hours. There was obtained a colorless, clear resin solution with a non-volatile content of 50% at a conversion of nearly 100%. The Gardner-Holdt viscosity of this resin solution was V-W at 25° C.

To 2,000 parts of the said resin solution was added 200 parts of monoisopropoxytrisacetylacetonatotitanium (complex compound of tetraisopropyl titanate and acetylacetone) together with 200 parts of toluene, and the mixture was thoroughly mixed to obtain a cold-setting clear varnish having a Gardner-Holdt viscosity of S-T.

The storage stability of this clear varnish was tested at room temperature for 14 months and at 50° C. for 30 days, to find neither viscosity increase nor other changes.

To 50 parts in terms of non-volatile matter of the said clear varnish was added 30 parts of rutile-type titanium dioxide and mixed on a 3-roll mill to obtain a white enamel. The white enamel was applied on a phosphate-treated steel plate by spray coating, and dried at ordinary temperature (20° C.) for 24 hours. The properties of the film thus obtained are shown in Table 1, column C.

EXAMPLE 4

Into a glass flask were charged 500 parts of mixed xylene and 500 parts of n-butanol. After the air in the flask had been replaced with nitrogen, the temperature in the flask was elevated to the azeotropic point of the mixture of mixed xylene and n-butanol, and the mixture was kept refluxing. Thereafter, to the mixture was added dropwise a solution consisting of 500 parts of methyl methacrylate, 100 parts of acrylonitrile. 250 parts of 2-ethylhexyl acrylate, 150 parts of fumaric acid, and 25 parts of di-tert-butyl peroxide over a period of about 3 hours. After completion of the dropwise addition, the reaction was continued for a further 4 hours to obtain a colorless clear resin solution with a non-volatile content of 50% at a conversion of nearly 100%. The Gardner-Holdt viscosity of the resin solution was Y–Z at 25° C.

To 100 parts of the said resin solution was added 9.39 parts of mixed xylene together with 11.90 parts of a reaction mixture obtained by reacting 5.95 parts of tetrastearyl titanate with 3.44 parts of dibutyl malonate and 2.6 parts of acetylacetone, and the resulting mixture was thoroughly mixed to obtain a cold-setting clear varnish having a Gardner-Holdt viscosity of U–V (25° C.).

The storage stability of this clear varnish was tested at room temperature for 14 months and at 50° C. for 30 days, to find neither viscosity increase nor other changes.

To 50 parts in terms of non-volatile matter of the said clear varnish was added 40 parts of rutile-type titanium oxide and mixed on a 3-roll mill to obtain a white enamel. The white enamel thus obtained was applied on a phosphate-treated steel plate by spray coating, and dried at ordinary temperature (20° C.) for 24 hours. The properties of the film thus obtained are shown in Table 1, column D.

EXAMPLE 6

Into a glass flask was charged a mixed solution consisting of 50 parts of toluene, 25 parts of methyl ethyl ketone, 25 parts of methyl isobutyl ketone, 40 parts of vinyltoluene, 30 parts of methyl acrylate, 10 parts of methacrylic acid, 1 part of benzoyl peroxide, and 1 part of tert-butyl hydroperoxide. The temperature in the flask was adjusted to 75° C. While introducing nitrogen, the reaction was continued for 10 hours to obtain a colorless, clear resin solution with a non-volatile content of 50% at a conversion of nearly 100%. The Gardner-Holdt viscosity of the resin solution was Y–Z (25° C.).

To 100 parts of the said resin solution was added 7.5 parts of mixed xylene together with 13.31 parts of a reaction mixture obtained by reacting 4.83 parts of a dimer of tetrabutyl titanate with 2.67 parts of methyl acetoacetate and 5.81 parts of acetylacetone, and the resulting mixture was thoroughly mixed to obtain a cold-setting, clear varnish having a Gardner-Holdt viscosity of U–V (25° C.).

To 50 parts in terms of non-volatile matter of the said clear varnish was added 40 parts of rutile-type titanium oxide and mixed on a 3-roll mill to obtain a white enamel. The white enamel was applied on a phosphate-treated steel plate and dried at 80° C. for 5 minutes. The properties of the film thus obtained are shown in Table 1, column F.

TABLE 1

| | A | B | C | D | E | F | I | II |
|---|---|---|---|---|---|---|---|---|
| Curing condition | 20° C./24 hr. | 20° C./24 hr. | 20° C./24 hr. | 20° C./24 hr. | 80° C./5 min. | 80° C./5 min. | 20° C./24 hr. | 150° C./20 min |
| Hardness [1] | 3H | 2H | H | 3H | H | 2H | 2H | 3H. |
| Gloss (60°) | 89 | 95 | 90 | 88 | 93 | 92 | 82 | 93. |
| Erichsen | 5 mm | 7 mm | 7 mm | 2 mm | 7 mm | 7 mm | 4 mm | 4 mm. |
| Cross-cut | 100/100 | 100/100 | 100/100 | 100/100 | 100/100 | 100/100 | 100/100 | 100/100. |
| Du Pont impact test (500 g., ½ in.) | 10 cm | 20 cm | 30 cm | 10 cm | 50 cm | 20 cm | >10 cm | 30 cm. |
| Bending | 6 mm | 2 mm | 2 mm | 8 mm | 2 mm | 2 mm | >8 mm | 8 mm. |
| Acid resistance [2] | Good | Good | Good | Good | Good | Good | Good | Good. |
| Alkali resistance [3] | Fair | do | do | Fair | do | do | Fair | Do. |
| Gasoline resistance [4] | Good | do | do | Good | do | do | do | Do. |
| Salt spray | do | do | do | do | do | do | Poor | Do. |
| Ultraviolet resistance [5] | Unaltered | Unaltered | Unaltered | Unaltered | Unaltered | Unaltered | Yellowed | Yellowed. |

[1] Pencil hardness.
[2] After immersion in a 5%-aqueous $H_2SO_4$ for 7 hours.
[3] After immersion in a 3%-aqueous NaOH for 7 hours.
[4] After immersion in "Idemitsu Hi-Octane" for 7 hours.
[5] After exposure to radiation from a germicidal lamp for 24 hours.

EXAMPLE 5

Into a glass flask were charged 40 parts of mixed xylene, 30 parts of n-butanol, and 30 parts of diacetone alcohol. After the air in the flask had been replaced by nitrogen, the temperature in the flask was elevated to the azeotropic point of the mixture of mixed xylene, n-butanol, and diacetone alcohol, and the mixture was kept refluxing. Thereafter, to the mixture was added dropwise a solution consisting of 35 parts of styrene, 60 parts of ethyl acrylate, 5 parts of maleic anhydride, and 2 parts of di-tert-butyl peroxide over a period of about 3 hours. After completion of the dropwise addition, the reaction was continued for a further 4 hours to obtain a colorless, clear resin solution with a non-volatile content of 50% at a conversion of nearly 100%. The Gardner-Holdt viscosity of the resin solution was S–T at 25° C.

To 100 parts of the said resin solution was added 8.1 parts of mixed xylene together with 13.91 parts of a mixture of 2.98 parts of tetraisopropyl titanate, 5.12 parts of salicylaldehyde and 5.81 parts of acetylacetone, and the resulting mixture was thoroughly mixed to obtain a cold-setting clear varnish having a Gardner-Holdt viscosity of Q–R (25° C.).

To 50 parts in terms of non-volatile matter of the said clear varnish was added 30 parts of rutile-type titanium dioxide and mixed on a 3-roll mill to obtain a white enamel. The white enamel was applied on a phosphate-treated steel plate by spray coating, and dried at 80° C. for 5 minutes. The properties of the film thus obtained are shown in Table 1, column E.

What is claimed is:

1. A one-package type cold-setting coating composition comprising
   (1) a copolymer having carboxyl groups, which is obtained by copolymerizing at least one ethylenically unsaturated monomer other than an α,β-ethylenically unsaturated carboxylic acid or at least one conjugated diene monomer with at least one α,β-ethylenically unsaturated carboxylic acid monomer, said copolymer containing 2 to 30% by weight of the α,β-ethylenically unsaturated carboxylic acid based on the total monomer,
   (2) a complex compound of (a) a titanate represented by the formula,

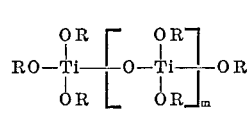

wherein m is zero or an integer of 1 to 20 and R is an alkyl group having 1 to 20 carbon atoms or an alkenyl group having 2 to 20 carbon atoms, with (b) at least equimolar amount of an α,β-diketone or its mixture with at least one other keto-enol tautomeric compound containing at least 0.5 mole of β-diketone, the ratio of said complex compound to the carboxyl group being 0.1 to 5.0 moles of the former to one equivalent of the latter; or a mixture of the (a) component and at least equimolar amount of the (b) component, the ratio of the (a) component to said carboxyl group being 0.1 to 5.0 moles of the former to one equivalent of the latter, and (3) a non-aqueous solvent.

2. A composition according to Claim 1, wherein the ethylenic or conjugated diene monomer is selected from the group consisting of ethylene, propylene, butadiene, isoprene, chloroprene, styrene, $\alpha$-methylstyrene, dimethylstyrene, divinyltoluene, vinyl acetate, vinyl propionate, vinyl chloride, vinyl ether, vinylidene chloride, acrylonitrile, methacrylonitrile, alkyl acrylates and alkyl methacrylates.

3. A composition according to Claim 1, wherein the $\alpha,\beta$-ethylenically unsaturated carboxylic acid is selected from the group consisting of acrylic acid, methacrylic acid, itaconic acid, maleic acid, maleic anhydride, fumaric acid, and crotonic acid.

4. A composition according to Claim 1, wherein the titanate is selected from the group consisting of tetraethyl titanate, tetraisopropyl titanate, tetrabutyl titanate, tetra-2-ethylhexyl titanate, tetrastearyl titanate, tetraallyl titanate, tetra-1-butenyl titanate, and dimers and trimers of these titanates.

5. A composition according to Claim 1, wherein the R's of the titanate are alkyl having 1 to 20 carbon atoms.

6. A composition according to Claim 1, wherein the $\beta$-diketone is acetyl acetone.

7. A composition according to Claim 1, wherein the at least one other keto-enol tautomeric compound is selected from the group consisting of aectoacetic ester, benzoylacetic esters, malonic diesters and salicylic esters.

8. A composition according to Claim 1, wherein the (2) component is a complex compound of 1 mole of the alkyl titanate with 1 to 4 moles of the $\beta$-diketone or its mixture with other keto-enol tautomeric compounds containing at least 0.5 mole of $\beta$-diketone.

9. A composition according to Claim 1, wherein the component (2) is a mixture of 1 mole of the alkyl titanate and 1 to 4 moles of the $\beta$-diketone or its mixture with other keto-enol tautomeric compounds containing at least 0.5 mole of $\beta$-diketone.

10. A composition according to Claim 1, wherein the non-aqueous solvent is at least one solvent selected from the group consisting of aromatic hydrocarbons, halohydrocarbons, ketones, alcohols, esters, ethers and petroleum solvents.

11. An article having on its surface a hardened film of the composition according to Claim 1.

References Cited
UNITED STATES PATENTS

| | | | |
|---|---|---|---|
| 3,632,546 | 1/1972 | Huang | 260—32.8 R |
| 2,924,614 | 2/1960 | Reuter | 260—429.5 |
| 3,002,854 | 10/1961 | Brill | 117—21 |

ALLAN LIEBERMAN, Primary Examiner

P. R. MICHL, Assistant Examiner

U.S. Cl. X.R.

260—31.2 R, 32.8 A, 33.2 R, 33.4 R, 33.6 A, 33.6 UA, 33.8 UA